(12) United States Patent
O'Dwyer

(10) Patent No.: US 7,225,099 B1
(45) Date of Patent: May 29, 2007

(54) APPARATUS AND METHOD FOR TEMPERATURE MEASUREMENT USING A BANDGAP VOLTAGE REFERENCE

(75) Inventor: John G. O'Dwyer, Maynooth (IE)

(73) Assignee: Xilinx, Inc., San Jose, CA (US)

( * ) Notice: Subject to any disclaimer, the term of this patent is extended or adjusted under 35 U.S.C. 154(b) by 99 days.

(21) Appl. No.: 11/055,213

(22) Filed: Feb. 10, 2005

(51) Int. Cl.
    *G01K 7/01* (2006.01)
(52) U.S. Cl. ..................................... 702/130
(58) Field of Classification Search ............... 702/130, 702/99; 374/100; 700/276
    See application file for complete search history.

(56) References Cited

U.S. PATENT DOCUMENTS 5,961,215 A * 10/1999 Lee et al. ................. 374/178
6,775,638 B2     8/2004 Gauthier et al.

OTHER PUBLICATIONS

Retrieved from the Internet:, Aug. 17, 2006 <http://www.interfacebus.com/Logic_Prefix_Temp_Range.html>, p. 1-2.*
Retrieved from the Internet:, Aug. 17, 2006 <http://en.wikipedia.org/wiki/Zeroth_law_of_thermodynamics>, p. 1-2.*
Retrieved from the Internet:, Aug. 21, 2006 <http://www.m-w.com/dictionary/nominal>, p. 1-2.*
Retrieved from the Internet:, Aug. 21, 2006 <http://www.cheap56k.com/glossary/CMOS.html>, p. 1.*
U.S. Appl. No. 10/837,135, filed Apr. 30, 2004, Goetting et al.
National Semiconductor, "Triple-Diode Input and Local Digital Termperature Sensor with Two-Wire Interface", LM83, Nov. 1999, pp. 1-20, available from National Semiconductor, P.O. Box 58090, Santa Clara, California, USA 95052-8090 or www.national.com.

* cited by examiner

*Primary Examiner*—John Barlow
*Assistant Examiner*—Tung S. Lau
(74) *Attorney, Agent, or Firm*—Marc R. Ascolese; Robert Brush

(57) ABSTRACT

Temperature measurement of an integrated circuit may be made using a bandgap voltage reference. In one example, a circuit includes a bandgap reference, a first output terminal, a second output terminal, and a calculation circuit. The bandgap reference includes a first amplifier having a first amplifier input coupled to a first transistor and a second amplifier input coupled to a second transistor. The first output terminal is coupled to the first and second transistors and is operable to provide a temperature independent voltage. The second output terminal is operable to provide a temperature dependent voltage. The calculation circuit is coupled to the first output terminal and the second output terminal and is configured to subtract from the temperature dependent voltage a difference between the temperature independent voltage and a nominal temperature independent voltage.

7 Claims, 4 Drawing Sheets

APPARATUS AND METHOD FOR TEMPERATURE MEASUREMENT USING A BANDGAP VOLTAGE REFERENCE

TECHNICAL FIELD

The present invention relates to temperature measurement on integrated circuits, and more particularly to temperature measurement on integrated circuits using bandgap reference circuits.

BACKGROUND

Integrated circuit devices, such as processors, microcontrollers, application specific integrated circuits (ASICs), programmable logic devices (PLDs), programmable logic arrays (PLAs), complex programmable logic devices (CPLDs), and field programmable gate arrays (FPGAs), can include numerous types of discrete circuit components, including transistors, resistors, and capacitors, as well as other components or circuit structures. Device designers and manufacturers routinely attempt to increase the speed and performance of such integrated circuit devices while at the same time reducing die and/or package size and maintaining device reliability. However, the presence of hundreds of thousands or millions of closely-spaced transistors and other discrete components exhibiting sub-micron dimensions and operating at high clock rates inevitably causes the device to exhibit high power dissipation and heating.

High temperatures can damage or destroy integrated circuit components, and operation of an integrated circuit at a temperature above a certain level can be indicative of design or manufacturing defects in the device. Consequently, many systems, devices, and techniques exist for measuring and monitoring integrated circuit temperature.

FIG. 1 illustrates a simplified block diagram of prior art integrated circuitry temperature monitoring devices and techniques. In this example, the integrated circuit 100 (shown as an FPGA in the figure) includes a simple diode structure 105 fabricated on its die. The anode and cathode of diode 105 (shown here as corresponding to the base and the emitter of the pnp device) are bonded out to external pins of integrated circuit 100, which in turn are coupled to diode current source and sink pins of temperature sensor integrated circuit 110. Temperature sensor integrated circuit 110 typically measures the change in diode 105's base-emitter voltage ($V_{BE}$) at two different operating points. For a bias current ratio of N:1, the difference between the two voltage measurements is given by:

$$\Delta V_{BE} \eta \frac{kT}{q} \ln[N].$$

With the measured value of $\Delta V_{BE}$, temperature sensor integrated circuit 110 can determine the temperature T of the diode from the constants k (Boltzmann's constant) and q (electron charge), as well as the known value of the bias current ration N. The only remaining parameter, $\eta$ (the non-ideality factor of the process on which the diode was manufactured) can be specified using information from the device manufacturer. An example of temperature sensor integrated circuit 110 is the LM83 Triple-Diode Input and Local Digital Temperature Sensor with Two-Wire Interface from National Semiconductor Corporation. Numerous other similar devices will be well known to those having ordinary skill in the art. Once a device temperature is determined, it can be reported, logged, or compared to a threshold value. In the example illustrated, temperature sensor integrated circuit 110 compares the measured temperature to a threshold value, and signals some other device, e.g., hardware shutdown circuitry, when the measured value exceeds the threshold.

While the devices and techniques shown in FIG. 1 offer the advantages of relative simplicity and accuracy, they offer a number of disadvantages. For example, in order to reduce parasitic resistances in series with the diode 105, the diode is manufactured in such a way that it consumes a large area on the die of integrated circuit 100. Because die real estate can be very valuable, this often restricts implementation to one diode, and thus one measuring point, per die. Additionally, diode 105 typically needs to be located close to the edge of the die to further reduce parasitic effects in the signal from the device. Unfortunately, the edge of the die is not necessarily the best (or most representative) location to measure temperature, e.g., the center of the die is typically better. As illustrated, both the anode and cathode have to be bonded to dedicated pins of integrated circuit 100, thereby adding to packaging costs. Moreover, the temperature measurement system uses a specialized external device (circuit 110). Finally, additional parasitic effects can impact device signals because temperature sensor integrated circuit 110 is not connected directly into diode 105, but is instead connected through PCB traces, to package pins, through packaging, along bond wires to die bond pads.

Accordingly, it is desirable to have integrated circuit temperature measurement devices and techniques that reduce or eliminate many of the deficiencies of the prior art.

SUMMARY

In an exemplary embodiment of the present invention a conventional bandgap reference circuit is used to provide an accurate temperature measurement of an integrated circuit on which it is formed. A temperature dependent voltage is measured from a portion of the bandgap circuit. This temperature dependent voltage can be further corrected for process variation etc., using the temperature stable bandgap reference voltage.

Accordingly, one aspect of the present invention provides a circuit comprising a bandgap reference, a first output terminal, and a second output terminal. The bandgap reference includes a first amplifier having a first amplifier input, a second amplifier input, and an amplifier output. The bandgap reference also includes a first transistor coupled to the first amplifier input, and a second transistor coupled to the second amplifier input. The first output terminal is operable to provide a temperature independent voltage. The second output terminal is operable to provide a temperature dependent voltage.

Another aspect of the present invention provides a method. A bandgap reference voltage signal is generated from a bandgap reference circuit. A temperature dependent voltage signal is generated from the bandgap reference circuit. The temperature dependent voltage signal is corrected using the bandgap reference voltage signal.

Another aspect of the present invention provides an apparatus including: a means for generating a substantially temperature independent voltage signal; a means for generating a temperature dependent voltage signal from the means for generating a substantially temperature independent voltage signal; and a means for correcting the temperature dependent voltage signal using the substantially temperature independent voltage signal.

The foregoing is a summary and thus contains, by necessity, simplifications, generalizations and omissions of detail; consequently, those skilled in the art will appreciate that the summary is illustrative only and is not intended to be in any way limiting. As will also be apparent to one skilled in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

Figure 2:
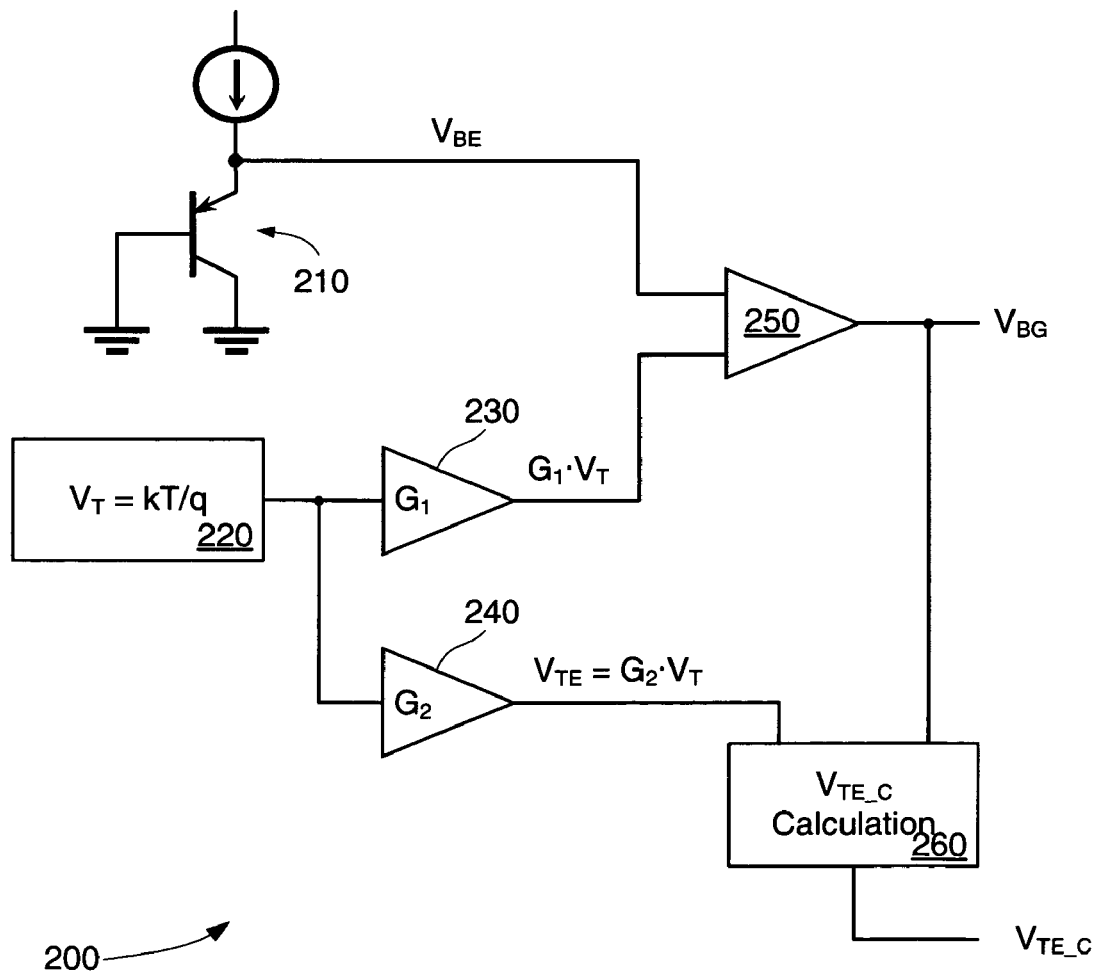
FIG. 2 illustrates a simplified block diagram of a system for measuring device temperature using a bandgap reference.

FIG. 2 illustrates a simplified block diagram of a system for measuring device temperature using a bandgap reference. The bandgap reference is fabricated on the same integrated circuit die whose temperature is to be measured. In some embodiments, the bandgap reference can be part of a dedicated temperature measurement circuit. In other embodiments, the bandgap reference used for temperature measurement can be a reference circuit that is designed for normal use, i.e., it serves as a voltage reference for the integrated circuit.

Integrated circuits typically make extensive use of voltage and current references. Such references are DC quantities that exhibit little dependence on power supply and fabrication process parameters, while also demonstrating a well-defined (or preferably no) dependence on temperature. The bandgap reference circuit is, perhaps, the most commonly implemented of such reference circuits.

As is well known to those having ordinary skill in the art, bandgap reference voltage circuits provide a substantially constant output reference voltage over a temperature range. To accomplish this, bandgap references provide temperature compensation so that the output reference voltage does not vary with temperature. Generally, the output reference voltage is a function of the base-to-emitter voltage ($V_{BE}$) of one bipolar transistor and the difference between the base-to-emitter voltages ($\Delta V_{BE}$) of a pair of bipolar transistors having different associated current densities. The value of the temperature independent reference voltage is generally adjusted by scaling $\Delta V_{BE}$. This arrangement provides the desired temperature compensation since $V_{BE}$ of a bipolar transistor has a negative temperature coefficient while $\Delta V_{BE}$ of a pair of bipolar transistors has a positive temperature coefficient. Thus, the temperature variations of the $V_{BE}$ and the $\Delta V_{BE}$ terms establishing the reference voltage can be made to cancel, thereby providing an output reference voltage that is essentially constant with respect to temperature.

Numerous different bandgap reference circuit implementations exist, but all share the common feature that the negative temperature coefficient of the diode/transistor PN junction is balanced with a voltage exhibiting a positive temperature coefficient. Temperature measurement system 200 includes pnp device 210 from which the base-emitter voltage $V_{BE}$ is derived. Positive temperature coefficient voltage circuit 220 provides the balancing signal $V_T$, which is shown as the thermal voltage kT/q. As is well known in the art, various different circuits can be used to implement circuit 220. The signal $V_T$ is appropriately amplified using amplifier 230, and the amplified signal is combined with $V_{BE}$ by amplifier 250 to produce the bandgap voltage $V_{BG}$.

While bandgap voltage $V_{BG}$ may be used by various other devices and circuits on integrated circuit, it also provides a temperature independent reference that will be used by corrected temperature calculation circuit 260. Note that due to process variation and possibly mismatched components in the circuitry, $V_{BE}$ may still vary slightly from device to device. The difference between the measured bandgap voltage value ($V_{BG}$) and the nominal or design target bandgap voltage value ($V_{BG\_NOM}$) is used by corrected temperature calculation circuit 260 to determine a final temperature value.

Thus, $V_T$ is separately provided to another amplifier 240 which provides the temperature dependent output voltage $V_{TE}$. As noted above, the relationship between $V_T$ (and thus $V_{TE}$) and actual temperature T can vary with the process used to fabricate the integrated circuit. Corrected temperature calculation circuit 260 receives $V_{TE}$ and $V_{BG}$, and produced the corrected voltage value $V_{TE\_C}$ by subtracting from $V_{TE}$ the difference between the actual bandgap reference value $V_{BG}$ and its nominal value $V_{BG\_NOM}$. Thus, corrected temperature calculation circuit 260 typically stores a value for $V_{BG\_NOM}$ (e.g., either programmed by design, or stored in a memory and supplied during device characterization) or uses a value for $V_{BG\_NOM}$ supplied by some means external to circuit 260 (not shown). The corrected voltage value $V_{TE\_C}$ can then be used to directly determine device temperature.

In general, it is important select the gain value ($G_1$) of amplifier 230 so as to adequately match the magnitude of the slope of the diode voltage $V_{BE}$. This will match the positive and negative temperature coefficients so that the output of amplifier 250 is independent of temperature. However, gain values $G_1$ and $G_2$ need not be the same, and gain value $G_2$ can generally be any desired value, including unity gain. For example, the gain value of $G_2$ could be determined by considering a convenient output value such as, exactly 1.0 v at a key temperature point, an output voltage in mV equal in value to some multiple of the temperature in ° K, or a value to fit the minimum and maximum range of an attached ADC (not shown) over a given temperature range. As will be seen below, the values are typically set by characteristics of the devices used to form the amplifiers. For example, corresponding amplifiers will typically have well defined ratios of certain design parameters such as resistor value. Such resistors are typically formed from well defined and characterized unit resistances, oriented in the same direction, having the same shape, trimable, etc.

In some embodiments, all of the components illustrated in FIG. 2 are incorporated into the integrated circuit die whose temperature is to be measured. Multiple instances of the same circuitry can be implemented on one die, e.g., to characterize temperature variation across the die or to monitor certain circuit blocks of the integrated circuit. In other embodiments, corrected temperature calculation circuit 260 is not located on the die of the target integrated circuit, while the remaining components are on that die. In such cases, corrected temperature calculation circuit 260 may be part of test equipment used to monitor and/or characterize a device under test. In still other embodiments, corrected temperature calculation circuit 260 is not explicitly implemented. Instead, the signals $V_{BG}$ and $V_{TE}$ are measured by external devices, and the above described calculation is performed by a user or data acquisition program. Numerous other variations will be well known to those having ordinary skill in the art.

Although the technique described above will work to compensate for process variation and component mismatch within the bandgap circuit, there can be additional sources of signal variation for which compensation is desired. For example, depending on the circuit topology, the difference voltage $V_{BG}-V_{BG\_NOM}$ may need to be adjusted by an additional factor to yield best results. Thus, in one embodiment the calculation performed is given by the following equation:

$$V_{TE\_C}=V_{TE}+\gamma(V_{BG}-V_{BG\_NOM}),$$

where $\gamma$ is a factor determined experimentally, but is nominally 1.

Various circuit parameters can influence $\gamma$, such as the non-ideal matching of the ratio of gain $G_1$ and $G_2$ and the significance of the contributions to error of various stages in circuit. The value of $\gamma$ can typically be determined by measuring $V_{TE}$ at a known temperature (e.g., when the integrated circuit die is in a test oven) and then calculating $V_{TE\_C}$ while adjusting $\gamma$ to give the best result. Various other experimental techniques can also be used to determine the value of $\gamma$.

Figure 3:
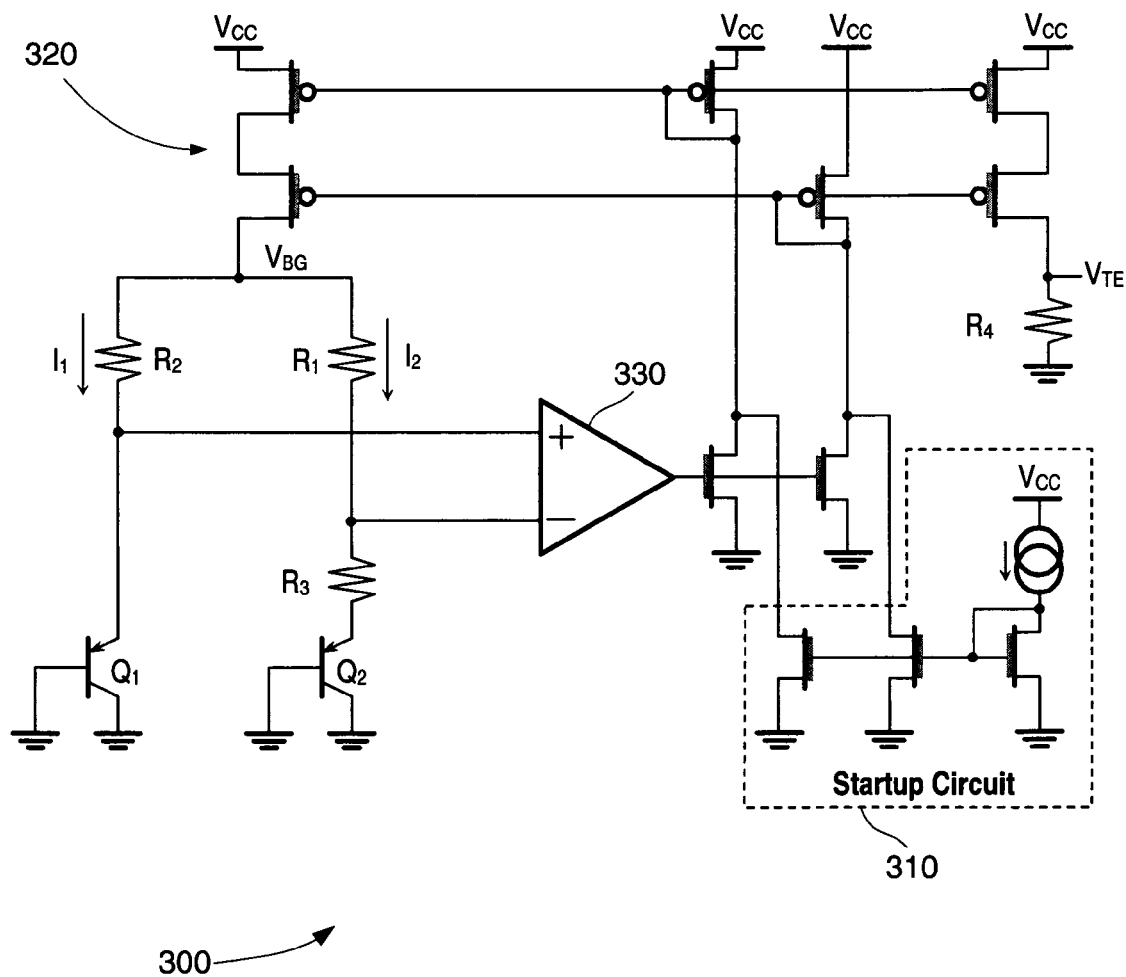
FIG. 3 illustrates a schematic diagram of a specialized bandgap circuit for use in temperature monitoring.

FIG. 3 illustrates a schematic diagram of a specialized bandgap circuit 300 for use in temperature monitoring. At the heart of circuit 300 are the circuit components for generating the bandgap voltage $V_{BG}$. Resistors R1, R2, R3, and R4 are typically matched resistors. The values of R1 and R2 are equal in this implementation. Bipolar transistors Q1 and Q2 are also designed to be matched transistors. Operational amplifier 330 drives cascaded current mirror 320 which sources currents $I_1$ and $I_2$ such that the voltage on both of its inputs are equal, due to the large open loop gain and negative feedback around the loop. The feedback loop ensures that $\Delta V_{BE}$ is equal to $R3 \cdot I_2$. This temperature dependent voltage is amplified across R1 and R2 and added to the opposite temperature dependent voltage across Q1. With the correct ratio of R2/R3, the two temperature coefficients cancel out and the bandgap voltage is independent of temperature. If the values of R1 and R2 are equal, then $I_1$ and $I_2$ are equal. When $I_1$ and $I_2$ are equal, the $\Delta V_{BE}$ between Q1 and Q2 is dependent only on the ratio of their areas according to the formula:

$$\Delta V_{BE} \eta \frac{kT}{q} \ln\left[\frac{A_1}{A_2}\right].$$

For $V_T$, amplifying the current via an area ratio between the current mirror transistors or by making R4 larger than R3 will amplify $\Delta V_{BE}$ by a constant value to give any desired range between the supplies. The voltages $V_T$ and $V_{BG}$ can be used along with the value of $V_{BG\_NOM}$ (and in some embodiments $\gamma$) to determined the correct voltage $V_{TE\_C}$ and hence the temperature of the circuit, as described above.

In general, circuit 300 is designed so that the current through the resistor/diode network is proportional to $\Delta V_{BE}$, and so by mirroring this current and converting it to a voltage (via resistor R4 matched to R1/R2/R3) a temperature dependent output voltage is obtained. Note that cascaded current mirror 320 is used in place of a more common current source, e.g., a single PMOS transistor, because without the cascaded structure, the mirroring of the current would be inaccurate due to the difference in drain voltages. Additionally, startup circuit 310 is provided to sink current from the PMOS current mirror structure instead of directly into the resistor/diode network. This design avoids using a startup current that would also have to be mirrored into R4, possibly leading to inaccuracies due to matching of the small transistors that are used in the circuit.

Figure 1:
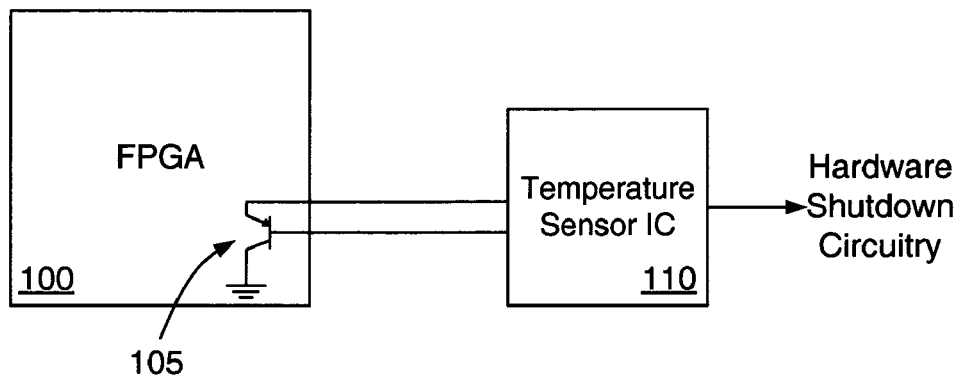
FIG. 1 illustrates a simplified block diagram of prior art integrated circuitry temperature monitoring devices and techniques.

In one embodiment, the values of R1, R2, and R3, are nominally 83.5 kΩ, 83.5 kΩ, and 8.84 kΩ, respectively. Assuming that R4 is made approximately as large as R1 and R2 so that the output voltage range is not too small, R4 will be approximately 65□m×i□□m in a modern fabrication process. Including R4 the area required for additional transistors (over a conventional bandgap circuit), circuit 300 can consume approximately 1,430□m² additional area. As a comparison, a typical diode used for prior art temperature sensing, such as device 105 in FIG. 1, can add 59,000□m² to the area requirement for the integrated circuit.

Figure 4:
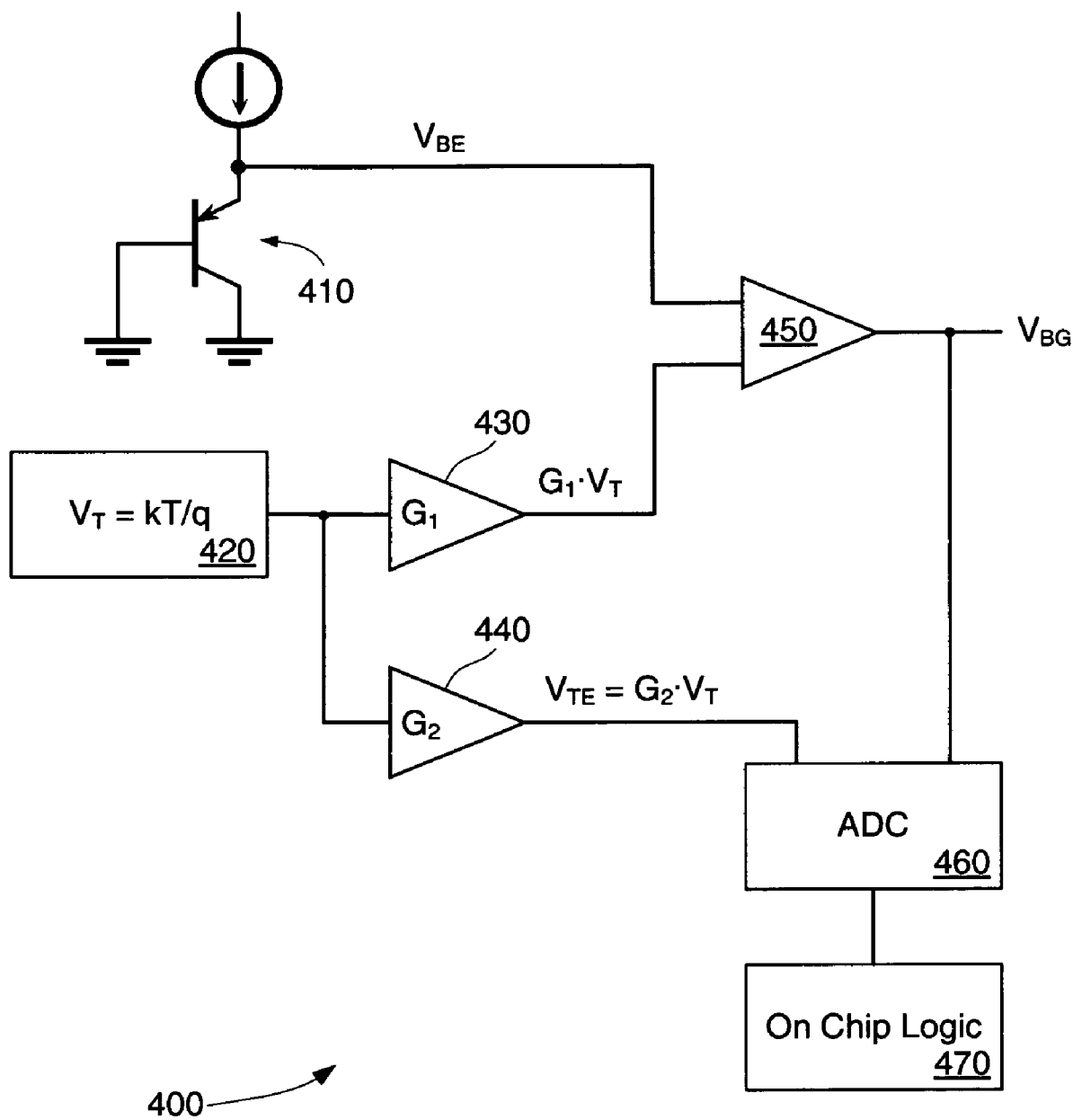
FIG. 4 a simplified block diagram of another system for measuring device temperature using a bandgap reference.

FIG. 4 a simplified block diagram of another system for measuring device temperature using a bandgap reference, and similar to that illustrated in FIG. 2. Temperature measurement system 400 includes pnp device 410 from which the base-emitter voltage $V_{BE}$ is derived. Positive temperature coefficient voltage circuit 420 provides the balancing signal $V_T$, which is shown as the thermal voltage kT/q. The signal $V_T$ is appropriately amplified using amplifier 430, and the amplified signal is combined with $V_{BE}$ by amplifier 450 to produce the bandgap voltage $V_{BG}$.

Signal $V_T$ is separately provided to another amplifier 440 which provides the temperature dependent output voltage $V_{TE}$. As noted above, the relationship between $V_T$ (and thus $V_{TE}$) and actual temperature T can vary with the process used to fabricate the integrated circuit. Consequently, both $V_{TE}$ and $V_{BG}$ are provided to analog-to-digital converter (ADC) 460. ADC 460 converts each signal into a digital value that is then passed to on chip logic 470 where the corrected voltage $V_{TE\_C}$ is calculated in one or more of the ways described above, e.g., by subtracting from $V_{TE}$ the difference between the actual bandgap reference value $V_{BG}$ and its nominal value $V_{BG\_NOM}$. On chip logic 470 can be further configured to determine the circuit temperature T from the corrected voltage value $V_{TE\_C}$. The temperature value can be provided as output to other circuits or devices, compared with a threshold value to determine further circuit activity (e.g., shutdown), stored, and the like. Those having ordinary skill in the art will readily recognize that on chip logic 470, can be configured to provide various different functions using the temperature information. Moreover, on chip logic 470 can be formed from a single logic circuit, or multiple logic circuits.

Numerous variations of the circuit 400 can also be implemented. For example, the calculation of $V_{TE\_C}$ can be performed using analog circuitry, and the resulting value can be subsequently converted from analog to digital form for further processing. In another example, no ADC is used, desired logic functions are instead performed by analog circuits.

Figure 5:
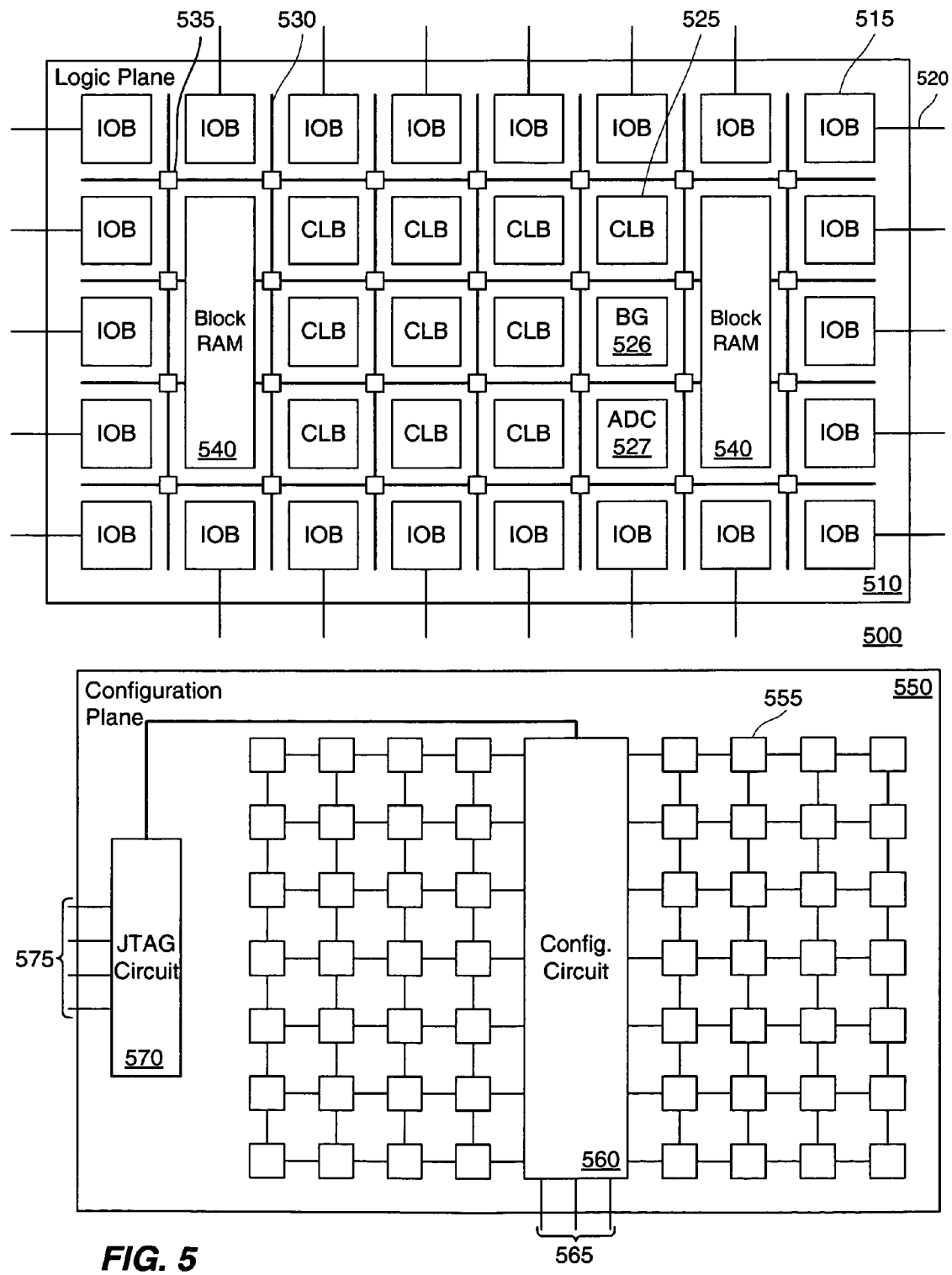
FIG. 5 is a simplified diagram illustrating a programmable logic device in accordance with one implementation of the present invention.

FIG. 5 is a simplified diagram illustrating an FPGA that implements a circuit similar to that illustrated in FIG. 4. Like many FPGAs, FPGA 500 includes programmable circuitry formed on a semiconductor substrate that is housed in a package having externally accessible pins. To simplify the following description, FPGA 500 is shown using a split-level perspective where it is functionally separated into logic plane 510 and configuration plane 550. In actual implementation, the circuitry of FPGA 500 may not be physically separated into logic and configuration planes as illustrated in FIG. 5. Other simplifications and functional representations are utilized to facilitate the following description.

Programmable logic plane 510 includes a plurality of input/output blocks (IOBs) 515 for providing the interface between package pins and internal signal lines, a plurality of configurable logic blocks (CLBs) 525 for configuring the desired programmable logic, and a programmable interconnect 530 for interconnecting the input and output terminals of these blocks. A plurality, of switch matrices 535 selectively connect the horizontal and vertical lines of programmable interconnect 530, thereby allowing full connectivity between any two elements of FPGA 500. IOBs 515, CLBs 525, programmable interconnect 530, and switch matrices 535 are customized by programming internal memory cells (555) using a software-generated, configuration bitstream. The values stored in these internal memory cells determine the logic function(s) implemented by FPGA 500.

In one embodiment, CLBs 525 are arranged in rows and columns, IOBs 515 surround the CLBS, and programmable interconnect 530 and switch matrices 535 are connected between the rows and columns of CLBs and IOBs. During normal operation of FPGA 500, logic signals are transmitted through device I/O pins 520, through the IOBs to the interconnect resources, which route these signals to the CLBs in accordance with the configuration data stored in configuration memory. The CLBs perform logic operations on these signals in accordance with the configuration data, and transmit the results of these logic operations to other CLBs and/or IOBs. Additionally, logic plane 510 includes dedicated random-access memory blocks (block RAM) 540 that are selectively accessed through the IOBs and interconnect resources. Other programmable logic plane resources, such as clock resources, are omitted from FIG. 5 for brevity.

Configuration plane 550 generally includes a configuration circuit 560 and configuration memory array 555. Configuration circuit 560 typically includes several input and/or output terminals that are connected to dedicated configuration pins 565 and to dual-purpose I/O associated with IOBs, e.g., I/O pins 520 (connection not shown). Configuration memory array 555 includes memory cells that can be arranged in "frames" (i.e., columns of memory cells extending the length of FPGA 500), and addressing circuitry (not shown) for accessing each frame. Configuration memory array 555 is typically formed from some combination of volatile configuration memory (e.g., SRAM) and nonvolatile memory (e.g., flash memory). The nonvolatile configuration memory may or may not be located on the same integrated circuit die as the device logic and volatile configuration memory. Thus, configuration memory array 555 is merely illustrative of the types of configuration memory used by FPGA 500.

JTAG circuitry 570 is included in configuration plane 550, and is also connected to at least one terminal of configuration circuit 560. JTAG circuit 570 includes multiple terminals 575. During configuration of FPGA 500, configuration control signals can be transmitted from dedicated configuration pins 565 to configuration circuit 560. Additionally, a configuration bit stream can be transmitted from either a terminal of JTAG circuit 570, or from IOB I/O pins, such as 520, to configuration circuit 560. During a configuration operation, circuit 560 routes configuration data from the bit stream to memory array 555 to establish an operating state of FPGA 500.

FPGA 500 also includes several specialized circuit blocks: temperature sensing bandgap circuit 526, and analog-to-digital converter (ADC) 527. Temperature sensing bandgap circuit 526 includes circuitry like that illustrated in FIGS. 2–4 to produce signals $V_{BG}$ and $V_{TE\_C}$. ADC 527 is used to convert those signals to digital values, and any one (or more) of CLBs 525 can be configured to perform desired calculations and temperature monitoring activity described above.

As noted above, the circuits and techniques of the present can be implemented with respect to various different types of integrated circuits including processors, microcontrollers, ASICs, PLDs, PLAs, CPLDs, and FPGAs. Thus, FIG. 5 is merely one example of a specific implementation.

The temperature measuring and monitoring circuits and techniques described in the present application can generally reduce circuit cost, e.g., through reduced die area, reduction in dedicated package pins, elimination of specialized external circuitry, etc. These circuits also allow for highly accurate and flexible temperature measurement techniques. The circuits can be used for production test, or in final devices, and can generally be located anywhere on an integrated circuit die.

Numerous variations and modifications to the circuits described in FIGS. 1–5 will be known to those having ordinary skill in the art. For example, many of the resistors illustrated can be implemented using a variety of programmable and/or trimable devices. Similarly, the disclosed devices and techniques are not necessarily limited by any transistor, resistor, or capacitor sizes or by voltage levels disclosed herein. Moreover, implementation of the disclosed devices and techniques is not limited by process technology, and thus implementations can utilize CMOS, NMOS, PMOS, and various bipolar or other semiconductor fabrication technologies. While the disclosed devices and techniques have been described in light of the embodiments discussed above, one skilled in the art will also recognize that certain substitutions may be easily made in the circuits without departing from the teachings of this disclosure. For example, a variety of logic gate structures may be substituted for the logic circuits shown, and still preserve the operation of the circuit, in accordance with DeMorgan's law. Also, many circuits using NMOS transistors may be implemented using PMOS transistors instead, as is well known in the art, provided the logic polarity and power supply potentials are reversed. In this vein, the transistor conductivity type (i.e., N-channel or P-channel) within a CMOS circuit may be frequently reversed while still preserving similar or analogous operation. Moreover, other combinations of output stages are possible to achieve similar functionality.

Regarding terminology used herein, it will be appreciated by one skilled in the art that any of several expressions may be equally well used when describing the operation of a circuit including the various signals and nodes within the circuit. Any kind of signal, whether a logic signal or a more general analog signal, takes the physical form of a voltage level (or for some circuit technologies, a current level) of a node within the circuit. Such shorthand phrases for describing circuit operation used herein are more efficient to communicate details of circuit operation, particularly because the schematic diagrams in the figures clearly associate various signal names with the corresponding circuit blocks and node names.

Although the present invention has been described with respect to a specific preferred embodiment thereof, various changes and modifications may be suggested to one skilled in the art and it is intended that the present invention encompass such changes and modifications that fall within the scope of the appended claims.

The invention claimed is:

1. A circuit comprising:
    a bandgap reference including:
        a first amplifier having a first amplifier input, a second amplifier input, and an amplifier output;
        a first transistor coupled to the first amplifier input; and
        a second transistor coupled to the second amplifier input;
    a first output terminal, coupled to the first transistor and the second transistor, operable to provide a temperature independent voltage;
    a second output terminal operable to provide a temperature dependent voltage; and
    a calculation circuit coupled to the first output terminal and the second output terminal, wherein the calculation circuit is configured to subtract from the temperature dependent voltage a difference between the temperature independent voltage and a nominal temperature independent voltage.

2. The circuit of claim 1 wherein the first amplifier is an operational amplifier, and further comprising:
    a current source coupled to the first transistor and the second transistor, wherein the operational amplifier drives the current source.

3. The circuit of claim 1 further comprising:
    a second amplifier coupled to the second output terminal, wherein the second amplifier amplifies the temperature dependent voltage to provide an amplified temperature dependent voltage.

4. The circuit of claim 1 wherein the calculation circuit is further configured to multiply the difference between the temperature independent voltage and the nominal temperature independent voltage by a correction factor.

5. The circuit of claim 1 further comprising:
    an analog to digital converter coupled to at least one of the first output terminal and the second output terminal, wherein the analog to digital converter is configured to convert at least one of the temperature independent voltage and the temperature dependent voltage into at least one corresponding digital value; and
    a logic circuit coupled to the analog to digital circuit and operable to receive the at least one corresponding digital value, wherein the logic circuit is further configured to determine a corrected temperature dependent voltage value using the at least one corresponding digital value and a nominal temperature independent voltage value.

6. The circuit of claim 1 wherein the circuit is formed on an integrated circuit die.

7. The circuit of claim 6 wherein the integrated circuit die is at least one of a processor, a microcontroller, an application specific integrated circuits (ASIC), a programmable logic device (PLD), a programmable logic array (PLA), a complex programmable logic device (CPLD), and a field programmable gate array (FPGA).

* * * * *